Nov. 10, 1936.  H. M. ROCKWELL  2,060,692
POWER TRANSMISSION CLUTCH
Original Filed June 11, 1931   4 Sheets-Sheet 1

INVENTOR.
Hugh M. Rockwell
BY
George L. Ljungtof
ATTORNEY.

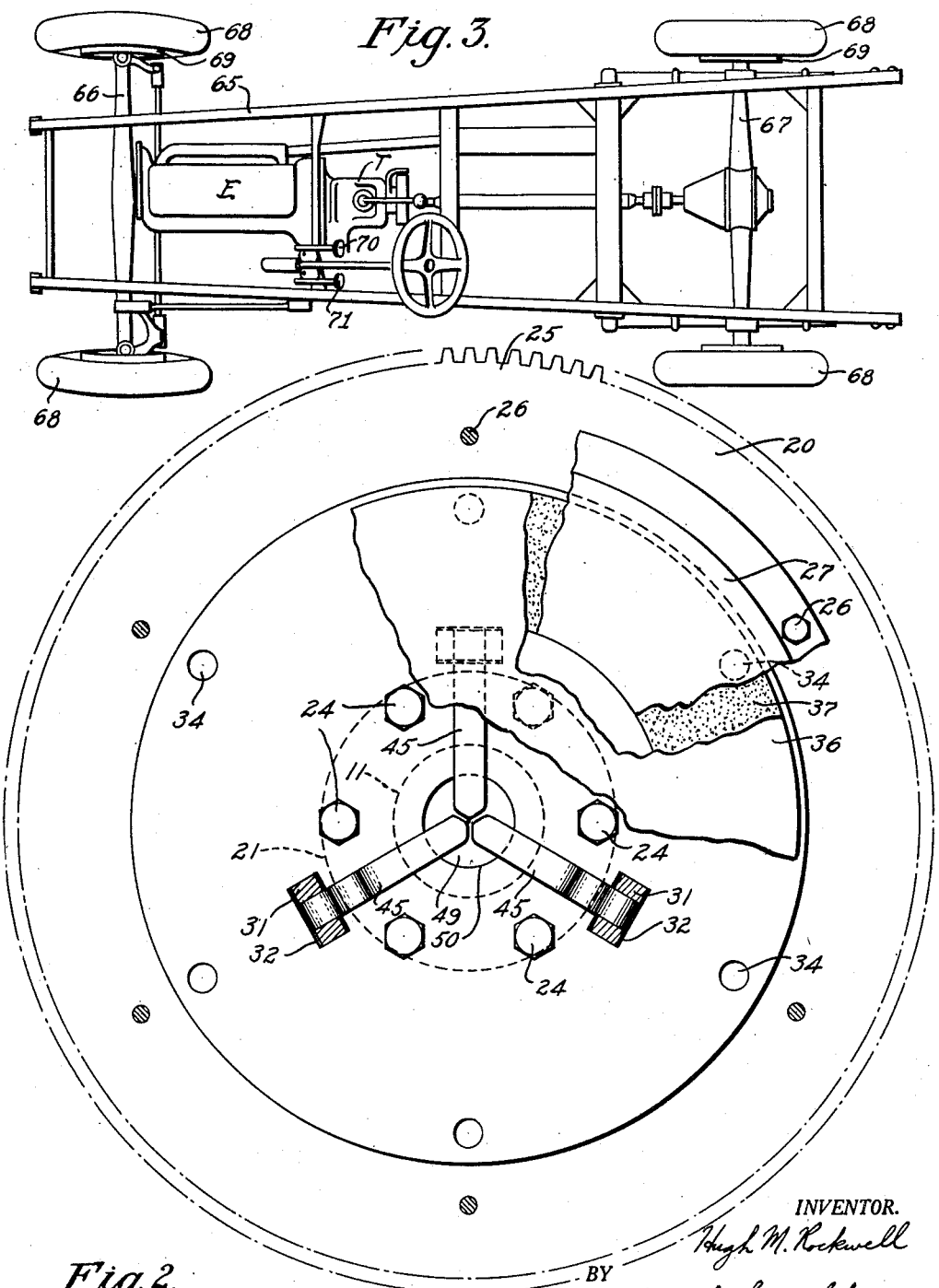

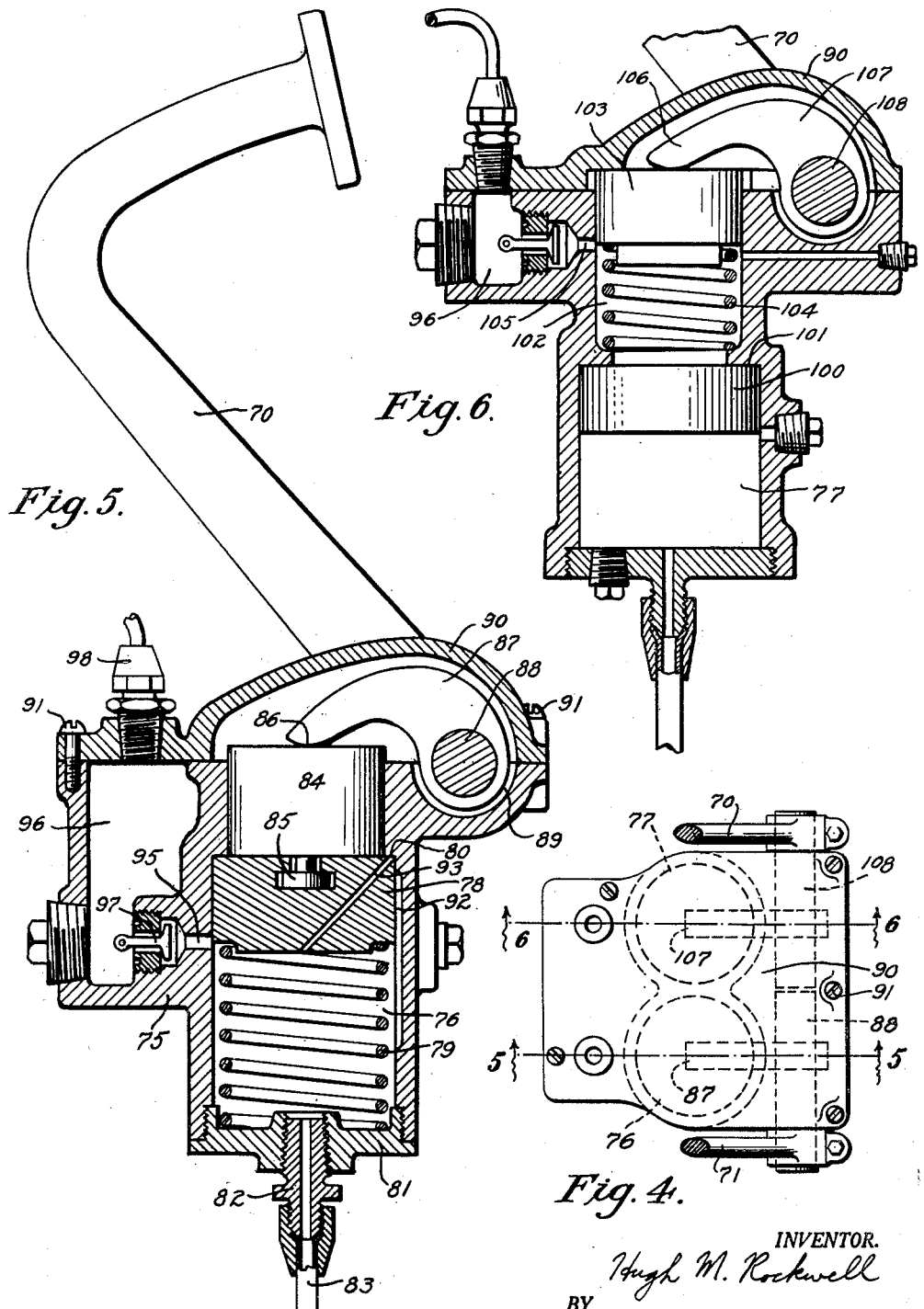

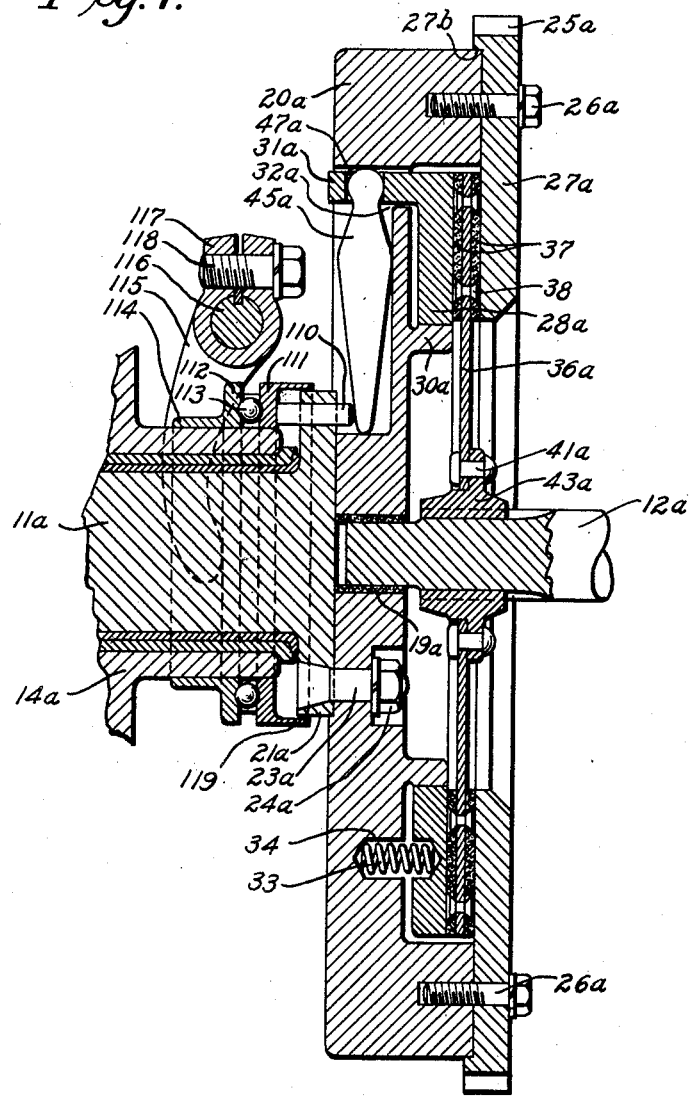

Patented Nov. 10, 1936

2,060,692

UNITED STATES PATENT OFFICE 2,060,692

POWER TRANSMISSION CLUTCH

Hugh M. Rockwell, Freeport, N. Y.

Refiled for application Serial No. 543,529, June 11, 1931. This application December 20, 1932, Serial No. 648,116

19 Claims. (Cl. 192—91)

The present invention relates to clutches for power transmission purposes, and refers more particularly to novel clutches and clutch actuating means which are especially well suited for use as automotive equipment.

In my earlier application, Serial No. 264,765, filed March 26, 1928, I have disclosed a novel power transmission clutch and hydraulic control means therefor, and the present invention is, in part, a carrying forward of the same broad inventive concept, with substantial additions, improvements, and refinements. The present invention formed the subject matter of my application Serial No. 543,529 filed June 11, 1931, of which this application is a refiling.

One of the objects of this invention is to provide a clutch with novel fluid pressure actuating means of such a character that the shaft will be free from any objectionable end thrusts as the clutch is engaged and released, and there will be no relatively rotating parts required to operate the clutch.

Another object of this invention is to provide an efficient clutch unit characterized by compactness of arrangement and simplicity of construction.

Another object of the invention is to provide such a clutch in which all the parts are well balanced with reference to the axis of rotation, and well fitted whereby to eliminate whipping, chattering, and the like.

A further object is to provide a clutch wherein all actuating parts, including springs, are entirely inclosed in rotating annular members, and wherein novel and simplified means are employed to control the alternate engagement and release of the clutch.

Another object of the invention is to provide in a clutch, means for gradually engaging the cooperating members in their final engaging movement, whereby to permit smoother operation and eliminate grabbing.

Another object of the invention is to provide such a clutch wherein the actuating forces are distributed more advantageously than in prior art devices.

Another object is to provide a clutch or clutch system wherein wear of the parts is taken up automatically and in such a manner as always to maintain a definite relative movement of the operating pedal or equivalent actuating means.

Still another object is to provide a novel and simplified means for controlling a clutch hydraulically.

Another object of the invention is to provide an improved master cylinder unit for motor vehicles having either hydraulic brakes, hydraulic clutch, or both.

Another object is to provide a clutch which can readily be disposed within an engine flywheel, with the clutch-actuating means disposed at the driving side whereby substantially to reduce the total length of an automotive power plant.

The foregoing and other objects, features, and advantages of the invention will be fully understood from the following description in connection with the accompanying drawings, wherein, the invention has been shown only by way of illustration, and wherein Figure 1 is a vertical, transverse, sectional view through one form of clutch embodying the invention;

Fig. 2 is an end view thereof, partly broken away and partly in section;

Fig. 3 is a top plan view of an automobile chassis equipped with the clutch and control means of this invention;

Fig. 4 is a top plan view of the improved clutch and brake control unit per se;

Fig. 5 is a vertical, transverse, sectional view on line 5—5 of Fig. 4, and showing the clutch control cylinder;

Fig. 6 is a vertical transverse, sectional view on line 6—6 of Fig. 4, and showing the brake control cylinder; and Fig. 7 is a vertical, transverse, sectional view through another embodiment of the invention.

Figure 1:
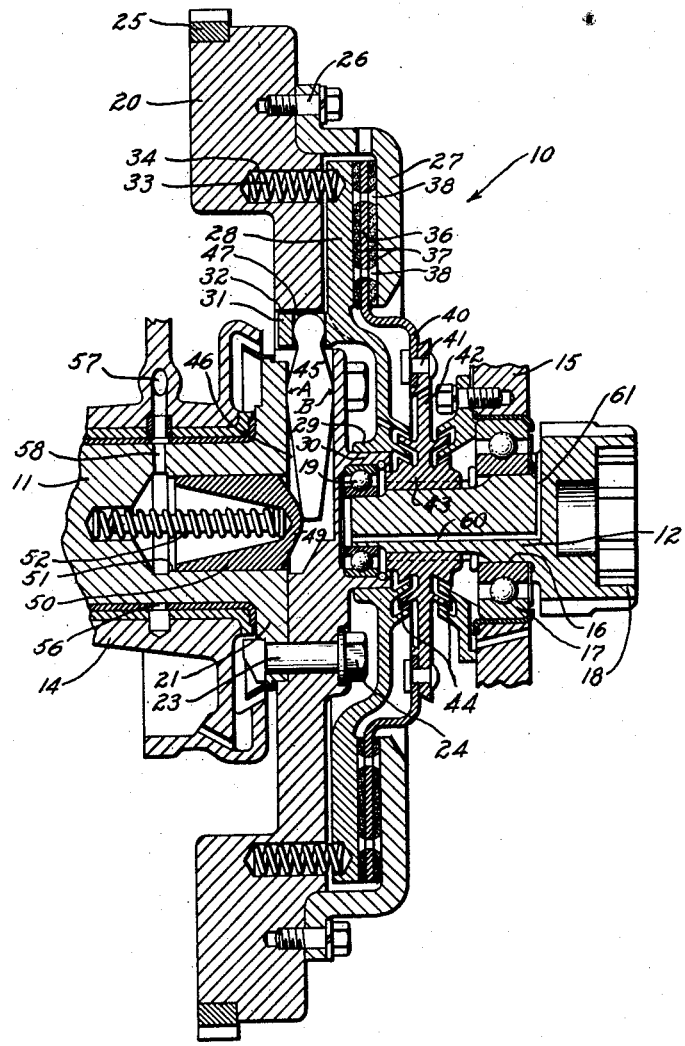

In Figs. 1 and 2, the novel clutch 10 has been shown in conjunction with a flywheel such as is commonly used in automotive engines, but the invention is not necessarily limited to such an arrangement. This illustrated embodiment provides a disengageable driving connection between a driving shaft 11 and a driven shaft 12, the driving shaft 11 in this instance being an engine crankshaft journalled in a bearing 14, while the driven shaft 12 is part of the usual speed-change transmission. These shafts are, of course, in axial alinement and may be of any ordinary, desired, or conventional form. For example, the shaft 12 extends through the end wall 15 of the transmission case, and is journalled intermediate its ends as at 16 in an anti-friction bearing 17. The inner end of the shaft is provided with a gear 18 and adapted for connection to a jack shaft or the like, not shown, while the outer end is reduced in diameter and piloted in the inner race of a ball bearing 19 which is fitted into the center of a fly wheel 20.

The end of the shaft 11 is formed with a flange 21 to which the flywheel 20 is secured as by a series of bolts 23 and nuts 24. The peripheral portion of the flywheel is of increased thickness, as usual, and provided with a ring gear 25 for connection with a starting motor. A pair of annular driving members or discs 27 and 28 are carried by a flywheel, the outer disc 27 being rotatable in a single plane and secured to the flywheel by screws 26, while the inner disc 28 constitutes a pressure plate and is shiftable axially toward and from the disc 27. In order accurately to pilot the disc 28, it is provided with a bored central boss 29 having a sliding fit on a pilot sleeve 30 which surrounds the ball bearing 19. At suitably spaced points, the pressure plate 28 is formed on its inner face with lugs 31 of substantial proportions, said lugs fitting slidably into transverse apertures 32 in the web of the flywheel, and constituting keys for imparting rotary movement to the axially shiftable member 28. Normally, the member 28 is urged away from the flywheel and toward the disc 27 by the action of a series of compression springs 33 disposed in sockets 34 in the flywheel, and this spring pressure is made use of to effect a clamping action on an annular driven clutch member, disc, or friction plate 36 which is disposed between the members 27 and 28, and keyed to the driven shaft 12. It is this clamping action that effects a driving connection between the two shafts 11 and 12, and it is greatly facilitated by linings 37 of friction material on the opposite faces of the driven member 36, such linings being held in place by rivets 38, or otherwise as desired.

The driven clutch element or friction plate 36 has an offset central flange 40 secured by rivets 41 to a disc 42, which in turn has a central hub 43 splined on the shaft 12. This splined connection permits the element 36 to have a slight axial movement, but the extent of such movement is not necessarily very great. Incidentally, it is to be noted that the disc 42 is formed with angularly disposed oil rings 44 to cooperate with similar rings on the member 28 and on the wall 25 of the transmission case to prevent oil from reaching the friction surface.

In order to effect disengagement of the clutch and thus to break the driving connection between the shafts 11 and 12, suitable means are provided within the flywheel and crankshaft. For example, a plurality of levers 45 are radially disposed in grooves 46 in the inner face of the flywheel, said grooves intersecting the transverse apertures 32, and the outer ends of said levers being disposed in radial slots 47 in the key lugs 31. The number of levers 45 corresponds with the number of lugs 31, there being three of each in the illustrated embodiment, but of course more than three may be employed if desired. The outer end of each lever 45 is substantially circular, as shown in Fig. 1, whereby to have a free fit in the corresponding lug 31, while the body of each lever, intermediate its ends, is enlarged in width and adapted to bear against the outer surface of the shaft flange 21, as well as against the bottom of the groove 46. In other words, each lever is rockable at the points A and B, whence it tapers inwardly to an end of reduced width.

The inner ends of the three levers 45 come practically together at the center of the flywheel, and are there engaged by one end 49 of a plunger or piston 50 which is slidably disposed in a central bore 51 constituting a pressure cylinder in the end of the driving shaft 11. A light coil spring 52 normally maintains the pistons against the ends of the levers 45 so that there will be no lost motion in any of the parts, but the strength of said spring 52 is not sufficient to release the clutch. Thus by introducing fluid under pressure to the inner end of the cylinder bore 51, the piston 50 will be forced outwardly toward the clutch unit, causing the equalizing levers 45 to rock on the points B and moving the inner driving disc 28 to its disengaging position against the pressure of the springs 33. When this occurs, the normal clamping pressure on the driven disc 36 is relieved so that the driving connection is broken between the shafts 11 and 12.

While various ways may be resorted to for introducing the pressure fluid to the cylinder bore 51, I find it expedient to do this through the rear main bearing 14 of the engine. For example, the bearing may have its inner surface formed with an annular groove 56 communicating with a port 57 from a suitable pipe or fluid supply line, while the crankshaft 11 is formed with a transverse port 58 registering with the groove 56 and leading into the cylinder bore 51 adjacent the inner end thereof. Preferably, the actuating fluid is oil, fed from a pedal-controlled master cylinder of any desired form, and the system (including said ports, groove, and inner end of cylinder) is normally filled at a minimum pressure. Either ordinary lubricating oil from the engine oiling system, or a special non-freezing fluid may be used, as desired.

The novel clutch, constructed as described above, has many advantages, among which are the following:

(1) The actuating springs and levers, being disposed within the plane of rotation of the flywheel, are completely protected from injury;

(2) Such disposition of these parts gives more perfect balance to the complete assembly and leaves the exterior substantially smooth;

(3) The clutch unit is much shorter than prior art devices, and therefore, effects a saving in space which is important in motor vehicles, particularly where the drive is through the front axle;

(4) This reduction in length is further made possible by arranging the actuating means at the drive shaft end of the unit;

(5) The piston and equalizing levers are so related to the crank shaft when fluid pressure is applied to release the clutch that the end thrust on the shaft is equalized or balanced;

(6) Lubrication difficulties are not present. Other advantages will be obvious to those skilled in the art.

The anti-friction pilot bearing 19 may be initially packed with grease or the like, as usual, and various ways may be resorted to for replenishing the lubricant, if desired. By way of example, the driven shaft 12 in the illustrated embodiment has been shown as formed with a longitudinal passage 60 offset from the axis of the shaft and extending rearwardly to a point where it meets an inclined radial passage 61. The forward or outer end of the passage 60 leads into the housing where the bearing 19 is located, while the outer end of the passage 61 is in the gear 18 and within the transmission casing. Incidentally, it is to be noted that the said outer end of the passage 61 is much farther from the axis of rotation of the shaft than is the passage 60, and by reason of this fact, centrifugal force will tend to throw lubricant from the passage 61 outwardly into the transmission case during rotation. The oil in the passage 61 that remains off the center of the shaft is driven by centrifugal force through passage 60 to the bearing 19.

In Fig. 3, I have diagrammatically illustrated a conventional motor vehicle chassis in order fully to disclose one of the practical uses of the invention. In this view, the chassis frame 65 is resiliently supported on front and rear axles 66 and 67, respectively, said axles having the usual road wheels 68 provided with hydraulic brakes 69. The engine E and transmission case T may be of any ordinary or preferred type, but instead of being separated by the usual clutch housing, they may be secured directly together, the clutch unit 10 being disposed with the flywheel 20 in the bell housing of the engine crank case. Under the control of a pedal 70, fluid pressure may be generated to apply the hydraulic brakes 69, and similarly under the control of a pedal 71, fluid pressure may be generated to release the clutch 10. While various types of master cylinders may be employed for generating the fluid pressure referred to, I may prefer to make use of a novel control unit such as will now be described.

Referring particularly to Figs. 4, 5, and 6, it will be seen that this novel control unit comprises a body portion 75 which is formed with two spaced parallel cylindrical bores 76 and 77, the bore 76 being for the clutch control and the bore 77 being for the brake control. Slidably disposed within the bore 76 is a piston or plunger 78 which is acted upon by a compression spring 79 in the lower end of the cylinder, so that the piston or plunger is normally urged upwardly to an extreme position limited by an annular shoulder 80. The lower end of the cylinder 76 is fitted with any suitable form of cap 81 having an outlet opening for connection with a coupling member 82, whereby the interior of the cylinder 76 can be placed in communication with the port 57 in the engine bearing, through the medium of a passage or tube 83.

In its upper side the piston 78 is provided with an extension 84 of reduced diameter and which in the illustrated embodiment is formed of a separate piece of material and connected to the piston 78 by means of a T-shaped end 85, which facilitates assembly and alinement of the parts. This extension 84 normally comes to rest in a position above the top of the body member 75, as is clearly shown in Fig. 5, and is slidably engaged by the rounded end 86 of an actuating lever 87, which is secured in any desired manner to a rock shaft 88. The foot pedal 71 is secured to the outer end of the rock shaft 88 so that movement of said pedal by the operator of the car in which it is installed will result in corresponding movements of the lever 87 so as to move the pistons 78 downwardly and upwardly within the cylinder 76. The shaft 88 is, of course, appropriately journaled at 89 in the body portion 75 and preferably is held in place by a removable cap 90 which constitutes a closure for the upper side of the body 75, said cap being clamped in position by screw-threaded elements 91, or other suitable means. Thus, as the foot pedal 71 is depressed, the lever 87 is caused to rock in a counter-clockwise direction, as viewed in Fig. 5, with the result that the piston 78 is moved downwardly in the cylinder 75 and against the pressure of the spring 79, whereby to put pressure on the oil or other pressure fluid contained within the cylinder and to transmit such fluid pressure through the pipe 83, ports 57 and 58, to the clutch-actuating cylinder 51, and thus release the clutch, as has been previously explained. When the foot pressure is subsequently released from the pedal 71, it will, of course, return to its normal position of rest, permitting the piston 78 to move upwardly again in the cylinder under the influence of the spring 79.

It is desirable to cushion the upward movement of the piston 78 just before it comes to rest in its uppermost position so that the clutch will not be caused to engage too quickly, and for this reason the sidewall of the cylinder 76 is formed with one or more longitudinal grooves 92 through which some of the pressure fluid can reach the upper side of the piston 78 when the piston has moved downwardly in the cylinder a certain extent. The groove, or grooves 92, do not extend entirely up to the limiting shoulder 80 but terminate below the same sufficiently to constitute an annular trap for some of the fluid which thus passes to the upper side of the piston as it operates. In other words, a dashpot effect is produced by this construction so as to retard the upward movement of the piston at the end of its upward stroke, and the fluid which has become trapped at the upper side of the piston is allowed slowly to return to the lower side of the piston through a small port or passage 93 formed diagonally in the piston, as illustrated. The cross-sectional area of the passage 93, is of course, restricted so that the entrapped fluid will not flow through it too rapidly to destroy the cushioning effect.

In order to maintain consistent volume of pressure fluid in the system, means are provided for replenishing any losses which might occur through leakage or the like, and this is done through an inlet port 95 which extends through one of the sidewalls of the cylinder 76 and substantially in line with the lower side of the piston 78 when said piston is in its uppermost position of rest. Of course, as the piston begins to descend in its operating stroke, it completely covers the port 95 and imposes its pressure only upon the desired body of fluid within the cylinder. The inlet port 95 in the illustrated embodiment communicates with an oil reservoir 96 located at one side of the body member 75 and preferably a check valve 97 is employed in conjunction with the inlet port 95 so as to preclude the transmission of pressure from the cylinder to the reservoir while port 95 is being closed by piston 78. Of course, the reservoir 96 may be kept supplied with the oil or other fluid in any desired manner, but I prefer to connect the same through the medium of a pipe 98 or hose to the regular oil circulating system of the automobile engine, whereby the said reservoir will be constantly circulated so that it will be maintained in a clean condition and substantially at a uniform, workable temperature.

Referring more particularly to Fig. 6 of the drawings, it will be seen that the brake control cylinder is constructed somewhat differently from the clutch control cylinder just described and it is primarily characterized by the fact that the braking pressure which is generated and transmitted to the hydraulic brakes 69 of the vehicle is effected through the medium of a special oil or fluid, preferably one which will not be adversely affected by low temperatures, as in winter driving. Such special oil or fluid is disposed within the said cylinder 77 and below the piston 100, which is slidably disposed within the said cylinder, said piston being adapted to come to rest normally in the upper end of the cylinder and against an annular shoulder portion 101 of substantial proportions. Above the cylinder 77 and in axial alinement and communication therewith, is another cylindrical bore 102, within which is slidably disposed a plunger 103 which is normally urged upward by a coiled compression spring 104 arranged between the lower side of said plunger and the annular shoulder 101. Filling the space between the bottom of the plunger 103 and the top of the piston 100 is a body of oil of the same kind as that used in the clutch control cylinder 76 and constantly supplied through an inlet port 105 from an extension of the reservoir 96. The inlet port 105 is arranged substantially in line with the lower side of the plunger 103 when the latter is in its normal position of rest and so that it will be covered and the supply of oil cut off by the plunger when the latter commences its downward movement.

In order to move the plunger 103 downwardly within the cylinder bore 102 and thus impose pressure on the fluid below it, its upper side is engaged by the rounded end 106 of a lever 107 very similar to the previously described lever 87, and similarly secured to a rock shaft which is mounted in axial alinement with the rock shaft 88. Secured to the outer end of said shaft 108 is the brake pedal 78.

Thus it will be seen that as the brake pedal 78 is depressed by foot power, the lever 107 will be caused to rock in a counter-clockwise direction, as viewed in Fig. 6, causing the plunger 103 to move downwardly in the cylinder bore 102 against the pressure of the spring 104 and thus to generate pressure upon the body of oil confined between the lower side of the plunger 103 and the upper side of the piston 100. The pressure so generated will, of course, cause the piston 100, in turn, to move downwardly in its confining cylinder 77 and thus generate pressure upon the body of braking fluid below the piston 100, such pressure being transmitted through the fluid in the fluid conduits in the usual way to the hydraulic brakes 69 associated with the wheels of the vehicle.

As has been previously stated, any other form of master cylinder may be employed if desired in conjunction with the novel clutch shown in Fig. 1 of the drawings, or instead of a master cylinder, the clutch may be controlled manually by valves which alternately admit and cut off the supply of oil or other fluid from a pressure line. In fact, numerous modifications may be resorted to either in the clutch structure or the actuating means, some of such modifications being embodied in the clutch illustrated in Fig. 7.

In this modified embodiment of the invention, the parts have been further simplified in structure and the clutch disposed entirely within the flywheel. Here the driving shaft 11a and the driven shaft 12a are arranged substantially as before described, said shaft 11a being journaled in bearings 14a. One end of the driven shaft 12a is journaled at 19a in the center of the flywheel 20a, which in turn, is secured to the driving shaft flange 21a by bolts 23a and nuts 24a. The journal at 19a may be provided, as shown, with a bushing of self-lubricating material, or, if desired, an anti-friction bearing may be employed.

The starting motor gear 25a is secured to the flywheel by studs 26a, and is centered by means of an annular shoulder 27b which closely fits the periphery of the flywheel. The gear 25a is formed with a centrally apertured annular body portion 27a which extends radially inwardly of the rim of the flywheel and of such proportions as to function as the stationary clutch plate. A movable clutch plate 28a is slidably piloted on a central annular support 30a formed as an integral part of the flywheel 20a, and said movable clutch plate 28a is formed at suitably spaced points with lugs or projections 31a adapted to extend through openings 32a in the web of the flywheel. Furthermore, said disc or plate 28a is provided in one face with sockets for the accommodation of compression springs 33 which are concealed within the flywheel and which normally act upon the disc or plate 28a to force the same toward the plate 27a. An intermediate clutch disc 36a is disposed between the discs or plates 27a and 28a, and is provided at its opposite faces with annular lining of friction material 37 whereby to provide for a suitable friction driving engagement between the respective discs. Said intermediate disc 36a is secured by rivets or bolts 41a to a hub member 43a which is splined upon the driven shaft 12a whereby to be capable of rotation therewith and relative axial movement.

As in the first described embodiment, the axial movement of the disc or plate 28a is controlled by a plurality of equalizing levers 45a, the outer ends of which are fitted within suitable openings 47a in the lugs 31a, while the inner ends of said levers are disposed, as shown adjacent the driving shaft flange 21a. In this embodiment another modification of the invention is illustrated whereby the clutch can be released mechanically rather than hydraulically, and for this purpose the equalizing levers 45a adjacent their inner ends are engaged by slidable pins 110 carried by the flange 31a. The other ends of the pins 110 abut against a ring member 111 which constitutes one of the races of a ball bearing assembly which encircles the main bearing 14a of the engine and which cooperates with an opposing ring or race member 112 to confine between them a plurality of anti-friction balls or rollers 113. The ring member 112 is provided with an annular flange 114 and is normally engaged by the free ends of a yoke or fork 115 which straddles the flange 114 and is secured upon a rock shaft 116 through the medium of suitable clamping elements 117 and 118. The rock shaft 116 is connected in any suitable manner, either directly or indirectly, with a foot pedal of conventional form and by means of which the rock shaft may be actuated to control the engagement or disengagement of the clutch.

Thus, if the foot pedal is depressed, the rock shaft 116 will be caused to rock in a counter-clockwise direction, as viewed in Fig. 7, moving the free ends of the yoke 115 inwardly toward the flywheel 20a and acting through the rings 112 and 111 to correspondingly move the pins 110 against the inner ends of the equalizing levers 45a. Such movement is transmitted through the outer ends of equalizing levers so as to withdraw the movable clutch disc 28a to its disengaging position against the pressure of the springs 33, and when this is done the frictional engagement of the discs 27a and 28a is broken from the facings 37 of the intermediate disc 36a. In that way the driving connection between the two shafts is disconnected and will remain disconnected until the foot pressure is released from the pedal, whereupon the parts will automatically return to their normal relative position.

The arrangement just described is a highly desirable one, not only because of its simplified construction, but more particularly by reason of the fact that it considerably shortens the entire length of an automobile power plant and it confines the clutch within the limits of the flywheel. By being so confined, the parts of the clutch are adequately protected from injury which is an additional advantage. The reduction in over-all length is further made possible by arranging the actuating means, i. e., the rock shaft 116, the yoke 115 and cooperating parts on the driving shaft end of the clutch, which is believed to be a novel arrangement. It is to be understood, however, that the specified clutch arrangement illustrated in Fig. 7, is not limited to a mechanical actuation but can indeed be utilized in connection with the hydraulic control disclosed with reference to Fig. 1.

With reference to the hydraulic control means of Fig. 1, it is to be understood that any conventional or desired form of packing or gland may be employed to lead the oil into or through the shaft, in place of the specific port arrangement shown. Furthermore, it is to be noted that wear of the parts is automatically compensated by the pressure fluid so that there is never any slack in the system, and by reason of this important fact, the leverage of the pedal can be made greater than in prior art devices; this of course, is a great advantage. While the invention has been illustrated as applied specifically to a clutch, its salient features and principles may be embodied with equal advantages in a braking system, and in fact, numerous other advantages will be apparent to those skilled in the art to which this invention relates.

Obviously, the invention is susceptible of various changes and modifications other than those specifically shown and described, and the right is herein reserved to make such changes as fall within the scope of the appended claims, without departing from the spirit of the invention.

Having thus described my invention, what I claim is:—

1. In combination with an engine shaft, a flywheel, and driven shaft, a clutch to provide a disengageable driving connection between said shafts, said clutch comprising an axially movable driving disc carried by the flywheel, a driven disc splined to the driven shaft for limited axial movement thereon and adapted to be frictionally engaged by said driving disc, means located within the web of the flywheel for moving the driving disc to engaging and disengaging positions, and manually controlled actuating means associated with the driving shaft.

2. In combination with an engine shaft, a flywheel, and driven shaft, a clutch to provide a disengageable driving connection between said shafts, said clutch comprising inner and outer driving discs carried by the flywheel, the outer disc being rotatable in a single plane and the inner disc being axially shiftable toward and from the outer disc, a driven disc splined to the driven shaft for limited axial movement thereon and disposed between the two driving discs for frictional engagement therewith, a plurality of compression springs concealed within the flywheel and acting normally to force the inner driving disc against the driven disc, and thus to clamp it against the outer driving disc, actuating means arranged within the web of the flywheel and operative to move the inner driving disc to disengaging position against the action of said springs, and means at the driving side of the flywheel to control said actuating means.

3. In combination with an engine shaft, flywheel, and driven shaft, a clutch to provide disengageable driving connection between said shafts, said clutch comprising inner and outer driving discs carried by the flywheel, the outer disc being rotatable in a single plane and the inner disc being internally and centrally piloted for axial movement, a driven disc splined on the driven shaft for limited axial movement thereon and disposed between the driving discs for frictional engagement therewith, said driven shaft being piloted in the center of the flywheel, and actuating means for shifting the inner driving disc into and out of engaging position, said actuating means being disposed in part within the web of the flywheel and in part at the driving shaft side thereof.

4. A clutch comprising annular driving and driven members adapted for relative frictional engagement, one of said members being movable axially into and out of engaging position, yielding means acting normally to maintain said members in engagement with each other, a plurality of radially disposed equalizing levers disposed within the plane of the web of the flywheel and operative to effect said axial movement of one of the members to disengaging position against the action of said yielding means, and fluid-pressure means for actuating said levers simultaneously.

5. A clutch comprising annular driving and driven members adapted for relative frictional engagement, one of said members being movable axially into and out of engaging position, yielding means acting to engage or disengage said members relative to each other, a plurality of radially disposed equalizing levers located in the web of the flywheel and operative to effect said axial movement of one of the members to disengaging position and against the action of said yielding means, and centrally disposed fluid pressure means operative against the inner ends of said levers to actuate the same to control disengaging and engaging of the clutch members.

6. In combination with driving and driven shafts a clutch providing a disengageable driving connection between the shafts, said clutch comprising driving and driven discs associated with the respective shafts, yielding means acting normally to maintain said discs in engagement with each other, and fluid-pressure means centrally disposed in the driving shaft to move one of the discs axially away from the other to effect disengagement of the clutch.

7. In combination with driving and driven shafts, a clutch providing a disengageable driving connection between the shafts, said clutch comprising driving and driven discs associated with the respective shafts, yielding means acting normally to maintain said discs in engagement with each other, a plurality of radially disposed equalizing levers operative to effect axial movement of the driving disc away from the driven shaft and against the action of said yielding means, a pressure-responsive piston slidable in a central cylindrical bore in the driving shaft, said piston being operable against the inner end of said equalizing levers to actuate the same, the parts being so arranged as to function in releasing the clutch without imposing any end thrust on the driving or driven shafts, and means to supply pressure-fluid to the inner side of the piston in said bore.

8. In combination with driving and driven shafts, a clutch for providing a driving connection between said shafts, said clutch comprising friction members associated respectively with the shafts, means for normally maintaining the friction members in engagement with each other, fluid-pressure means in the end of the driving shaft for effecting disengagement of the friction members without imposing any substantial end thrust on the shaft, and means for supplying pressure-fluid to said means through one of the shafts.

9. In combination with an engine shaft, flywheel, and driven shaft, a clutch to provide a disengageable driving connection between said shafts, said clutch comprising an axially movable driving disc carried by the flywheel, a driven disc slidably keyed to the driven shaft and adapted to be frictionally engaged by said driving disc, a plurality of compression springs concealed within the flywheel and acting normally to maintain the driving disc against the driven disc, a plurality of radial equalizing levers disposed in grooves in the flywheel and constituting pry connections for disengaging the discs against the action of said springs, a piston slidable in a central cylindrical bore in the end of the driving shaft, said piston being operative against the inner ends of said levers to disengage the clutch discs, and means for supplying pressure-fluid to the inner side of the piston through the driving shaft.

10. In combination with an engine shaft, flywheel, and driven shaft, a clutch to provide a disengageable driving connection between said shafts, said clutch comprising inner and outer driving discs carried by the flywheel, the outer disc being rotatable in a single plane and the inner disc being axially shiftable toward and from the outer disc, a driven disc splined to the driven shaft and disposed between the two driving discs for frictional engagement therewith, means disposed within the flywheel for shifting said inner driving disc, and fluid-pressure means associated with the driving shaft and adapted to control said disc shifting means.

11. In combination with an engine shaft, flywheel, and driven shaft, a clutch to provide a disengageable driving connection between said shafts, said clutch comprising an axially movable driving disc carried by the flywheel, a driven disc keyed to the driven shaft for limited axial movement thereon and adapted to be frictionally engaged by said driving disc, a plurality of compression springs concealed within sockets in the flywheel and acting normally to maintain the driving disc against the driven disc, a plurality of radial equalizing levers disposed without fastening means in grooves in the flywheel and constituting pry connections for disengaging the discs against the action of said springs, an axially shiftable annulus encircling the driving shaft and operatively connected with the inner ends of said levers, and means for shifting said annulus to release the clutch.

12. In combination with a driving shaft and a driven shaft a wheel member carried by the driving shaft and formed with a plurality of radial grooves in one of its faces and a corresponding number of transverse apertures adjacent the outer ends of said grooves, a circular guide flange on the opposite face of the wheel member, an outer driving friction disc carried by the wheel member and rotatable in a single plane, an inner driving friction disc centrally supported by the said guide flange on the wheel member and movable axially with reference thereto, said inner driving friction disc being provided with lugs which extend inwardly through the transverse apertures in the wheel member, a driven friction disc splined to the driven shaft and disposed between the two driving discs for frictional engagement therewith, a plurality of equalizing levers rockably disposed in the radial grooves of the wheel member and having their outer ends loosely connected with the lugs of the inner driving disc, and means operative against the inner ends of said levers for rocking the same to move the inner driving disc axially to engaging and disengaging positions.

13. In combination with an engine shaft and a driven shaft, a flywheel carried by the engine shaft and formed with a plurality of radial grooves in one of its faces and a corresponding number of transverse apertures adjacent the outer ends of said grooves, a circular guide flange integrally formed on the opposite face of the flywheel, an outer driving clutch disc carried by the flywheel and rotatable in a single plane, an inner driving clutch disc centrally supported by the said guide flange on the flywheel and movable axially with reference thereto, said inner driving clutch disc being provided with lugs which extend inwardly through the transverse apertures in the flywheel, a driven clutch disc splined to the driven shaft and disposed between the two driving discs for frictional engagement therewith, resilient means within the flywheel and acting normally to force said inner disc against said driven disc and thus to clamp it against said outer driving disc, a plurality of equalizing levers rockably disposed in the radial grooves of the flywheel and having their outer ends loosely connected with the lugs of the inner driving disc, and means operative against the inner ends of said levers for rocking the same to move the inner driving disc to disengaging position against the action of said resilient means.

14. In combination with an engine shaft and a driven shaft, a flywheel carried by the engine shaft and formed with a plurality of radial grooves in one of its faces and a corresponding number of transverse apertures adjacent the outer ends of said grooves, a circular guide flange integrally formed on the opposite face of the flywheel, an outer driving clutch disc carried by the flywheel and rotatable in a single plane, an inner driving clutch disc centrally supported by the said guide flange on the flywheel and movable axially with reference thereto, said inner driving clutch disc being provided with integral lugs which extend inwardly through the transverse apertures in the flywheel, a driven clutch disc splined to the driven shaft and disposed between the two driving discs for frictional engagement therewith, a plurality of compression springs concealed within the flywheel and acting normally to force said inner disc against said driven disc and thus to clamp it against said outer driving disc, a plurality of equalizing levers rockably disposed in the radial grooves of the flywheel and having their outer ends loosely connected with the lugs of the inner driving disc, and means associated with the engine shaft and operative against the inner ends of said levers for rocking the same to move the inner driving disc to disengaging position against the action of said compression springs.

15. In combination with an engine shaft and a driven shaft, a flywheel carried by the engine shaft and formed with a plurality of radial grooves in one of its faces and a corresponding number of transverse apertures adjacent the outer ends of said grooves, a circular guide flange integrally formed on the opposite face of the flywheel, an outer driving clutch disc carried by the flywheel and rotatable in a single plane, an inner driving clutch disc centrally supported by the said guide flange on the flywheel and movable axially with reference thereto, said inner driving clutch disc being provided with integral lugs which extend inwardly through the transverse apertures in the flywheel, a driven clutch disc splined to the driven shaft and disposed between the driving discs for frictional engagement therewith, a plurality of compression springs concealed within the flywheel and acting normally to force said inner disc against said driven disc and thus to clamp it against said outer driving disc, a plurality of equalizing levers rockably disposed in the radial grooves of the flywheel and having their outer ends loosely connected with the lugs of the inner driving disc, means responsive to fluid pressure for actuating the levers by engaging the inner ends thereof, and means for leading the pressure fluid to said actuating means through the engine shaft.

16. In combination with an engine shaft and a driven shaft a flywheel carried by the engine shaft and formed with a plurality of radial grooves in one of its faces and a corresponding number of transverse apertures adjacent the outer ends of said grooves, a circular guide flange integrally formed on the opposite face of the flywheel, an outer driving clutch disc carried by the flywheel and rotatable in a single plane, an inner driving clutch disc centrally supported by the said guide flange on the flywheel and movable axially with reference thereto, said inner driving clutch disc being provided with integral lugs which extend inwardly through the transverse apertures in the flywheel, a driven clutch disc splined to the driven shaft and disposed between the two driving discs for frictional engagement therewith, a plurality of compression springs concealed within the flywheel and acting normally to force said inner disc against said driven disc and thus to clamp it against said outer driving disc, a plurality of equalizing levers rockably disposed in the radial grooves of the flywheel and having their outer ends loosely connected with the lugs of the inner driving disc, and means for mechanically actuating said levers, said means including slidable elements which are rotatable with the engine shaft and which engage the inner ends of said levers.

17. In combination with a driving shaft and a driven shaft, a wheel member carried by the driving shaft and formed with a plurality of radial grooves in one of its faces and a corresponding number of transverse apertures adjacent the outer ends of said grooves, a circular guide flange on the opposite face of the wheel member, an outer driving friction disc carried by the wheel member and rotatable in a single plane, an inner driving friction disc centrally supported by the said guide flange on the wheel member and movable axially with reference thereto, said inner driving friction disc being provided with lugs which extend inwardly through the transverse apertures in the wheel member, a driven friction disc splined to the driven shaft and disposed between the two driving discs for frictional engagement therewith, a plurality of equalizing levers rockably disposed in the radial grooves of the wheel member and having their outer ends loosely connected with the lugs of the inner driving disc, means responsive to fluid pressure for actuating the levers by engaging the inner ends thereof, and means for leading the pressure fluid to said actuating means through the driving shaft.

18. A clutch comprising a driving member having a central bearing portion surrounded by a housing, a driven member piloted in said bearing portion, and means including a pressure plate for establishing a detachable driving connection between the driving and driven members, said pressure plate being centralized and piloted by the outside of the housing which surrounds said bearing.

19. In combination with driving and driven shafts, a clutch providing a disengageable driving connection between the shafts, said clutch comprising driving and driven members associated with the respective shafts, yielding means acting normally to maintain said clutch members in engagement with each other, a plurality of radially disposed equalizing members operative to effect axial movement of the driving clutch member away from the driven shaft and against the action of said yielding means, a pressure responsive piston slidable in a central cylindrical bore in the driving shaft, said piston being operable against the inner end of said equalizing members to actuate the same, the parts being so arranged as to function in releasing the clutch without imposing any end thrust on the driving or driven shafts, and means to supply pressure fluid to the inner side of the piston in said bore.

HUGH M. ROCKWELL.